UNITED STATES PATENT OFFICE.

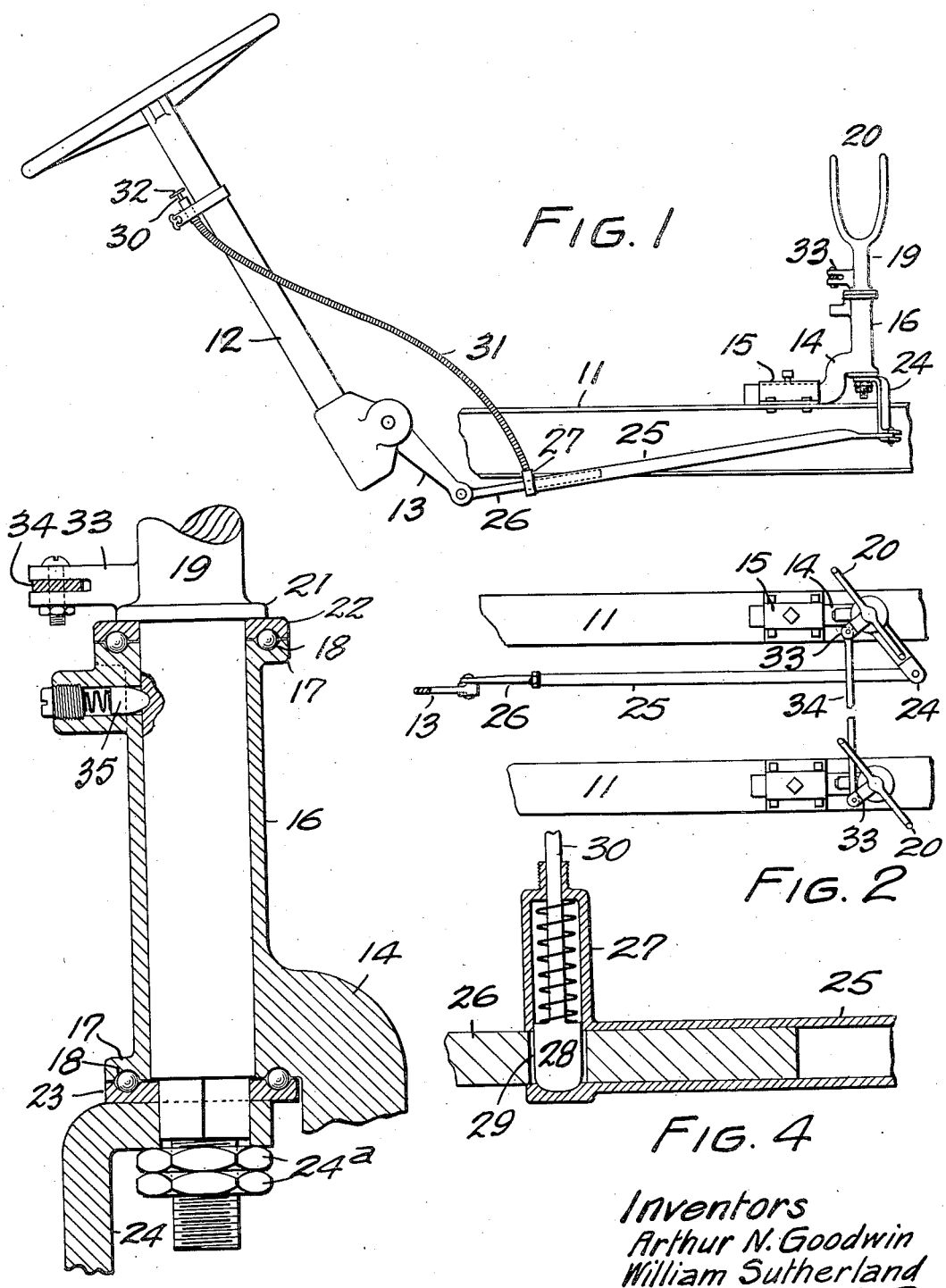

ARTHUR N. GOODWIN AND WILLIAM SUTHERLAND, OF MONTREAL, QUEBEC, CANADA.

DIRIGIBLE HEADLIGHT.

1,416,014.

Specification of Letters Patent. Patented May 16, 1922.

Application filed March 3, 1921. Serial No. 449,319.

*To all whom it may concern:*

Be it known that we, ARTHUR N. GOODWIN and WILLIAM SUTHERLAND, both subjects of the King of Great Britain, and residents of the city of Montreal, in the Province of Quebec and Dominion of Canada, have invented certain new and useful Improvements in Dirigible Headlights, of which the following is a full, clear, and exact description.

This invention relates to improvements in dirigible headlights, and the object of the invention is to provide a simple, inexpensive and efficient means for turning the headlights of a car automatically as the wheels turn, in order to illuminate a curve in the road over which a car is about to travel.

A further object is to provide a device in which the lamps will be free from vibration and minor movements caused by small oscillations of the wheels on a rough road.

A still further object is to provide means for disconnecting the lamps when not in use and for holding the lamps stationary and parallel with the axis of the car when so disconnected.

The device consists briefly of a bracket for each lamp adapted to be attached to the chassis of a car and having the lamp carrying members revolubly mounted therein in a manner to avoid rattling due to ordinary vibrations of the car. The lamp carrying members are operatively connected across the car and one of them is connected by means of a telescopic member directly with a lever at the bottom of the steering post. The telescopic operation of the connecting member is controllable by the driver of the vehicle to connect the lamps with and disconnect the same from the steering gear. Means are also provided to hold the lamps normally aligned with the car.

In the drawings which illustrate the invention:—

Fig. 1 is a side elevation of the device.

Fig. 2 is a plan view of the device.

Fig. 3 is an enlarged sectional view of one of the brackets and lamp carriers.

Fig. 4 is an enlarged sectional view of the connecting rod controlling means.

Referring more particularly to the drawings, 11 designates the side members of a motor car chassis and 12 the steering post thereof terminating in an oscillatable lever 13, to the free end of which the front wheels are connected for movement.

A specially formed bracket 14 for each lamp is secured to each side of the chassis by any suitable means such as a clamp 15 on the side member 11. This bracket includes a vertically disposed tubular portion 16 having upper and lower flanges 17 carrying ball races 18. The stems 19 of the lamp forks 20 are provided adjacent the forks with a collar or shoulder 21 carrying a ball race 22 corresponding with the ball race at the upper end of the bracket. The lower end of the stem 19 carries a washer 23 serving as a ball race co-operating with the lower ball-race of the bracket. Below the washer 23, the stem is preferably polygonally formed and carries a crank 24 secured by nuts 24ª on the threaded extremity of the stem. By tightening the nuts, the ball races 22 and 23 may be drawn together, so as to hold the stem tightly in the bracket and prevent any rattling due to vibration. The arm 24, which is of any suitable shape, is pivotally connected at its free extremity to one end of a telescopic member comprising a tubular portion 25 and a rod 26 sliding therein. The opposite end of this telescopic member is connected to the steering arm 13. The tubular member 25 is provided with a small housing 27 containing a spring-pressed locking pin 28 adapted to enter a slot 29 in the rod 26. This locking pin may be operated by the driver by means of a wire 30 passing through a flexible conduit 31 extending to any suitable point, such as the upper part of the post 12, where the conduit may be rigidly connected to the casing of the post and the end of the wire provided with a handle 32. The pin 28 is preferably thin and flattened and, when in engagement with the rod 26, is disposed edgewise with reference to longitudinal movement of the rod so as to form a strong connection between the rod 26 and tube 25. The parts 25 and 26 may be conveniently disconnected by pulling on the wire 30, so as to retract the pin, and then turning the wire through 90° to turn the pin across the slot 29, so that it cannot enter.

Each stem 19 is provided at any suitable point with the short arm or lug 33 to which a rod 34 may be connected to link up the two lamp supports, so that rotation transmitted to one by the telescopic member and crank 24 will be transmitted by the link 34 to the other lamp.

In order to hold the lamps against slight oscillations due to vibration or to minor movements of the wheels in passing over a rough road, a latch 35 is provided to releasably connect each stem 19 with the bracket in which it turns. This latch may conveniently be of the bullet type illustrated in Figure 3, or may be of any other suitable construction.

When driving in the daytime or at night in districts where dirigible headlights are contrary to law, the wire 30 is operated to withdraw the pin 28 and disconnect the parts 25 and 26, so that the part 26, which receives movement from the steering arm 13, will slide in the tube 25 without imparting movement thereto. During this condition, the stems 19 are releasably locked to the brackets carrying them by the latches 35 and hold both lamps in axial alignment with the axis of the car. When it is desired to turn the lights automatically with the movement of the wheels, the wire 30 is operated, so that the pin 28 engages the slot 29 in the member 26 and locks the members 25 and 26 together, so that movement is transmitted from the steering arm 13 through the members 26 and 25 to the arm 24 on one of the bracket stems 19. The stem and lamp carried thereby will thus be turned proportionately to the turning of the wheels, which are operatively connected to the member 13 or to a similar member. The movement imparted to one stem 19 is transmitted across the car to the other stem by means of the rods 34, so that both lamps oscillate in unison with one another and with the front wheels. When driving on a rough road, the lamps and their turning mechanism are entirely relieved of road shock and vertical movement of the front axle and also of small oscillatory movement of the front wheels by reason of the connection direct to the steering arm, which connection is entirely independent of connection between the steering arm and wheels. When driving on a straight road, the latches 35 will hold the lamps axially parallel and directed straight ahead of the car and also hold them against responding to small movements of the wheels, which are permitted by slackness in the steering gear. The device may be very easily and quickly rendered either operative or inoperative. The slot 29 and pin 28 are located to register when the lamps are directed straight ahead and the steering arm also set for movement straight ahead Thus, the parts 25 and 26 are normally in position to be locked together by the pin 28. If the pin should fail to mesh with the slot immediately, the desired meshing may be produced by slightly rocking the steering wheel. Disconnection of the parts 25 and 26 to render the lamps stationary relatively to the car may be effected in any position of the car or steering mechanism, but the disconnection is preferably effected when the car is travelling straight ahead, so that the lamps will be automatically locked in this position by the latches 35. It will be understood that many modifications may be made in structural details such as the locking means 28 and latches 35 without departing in any way from the spirit of the invention.

Having thus described our invention, what we claim is:—

1. A dirigible headlight mechanism comprising a steering arm, a rotatable lamp support, a hollow member secured to said lamp support and provided with a laterally directed casing closed at its outer end and in direct communication with the bore of the hollow member, a second member slidable in the hollow member and secured at its outer end to the steering arm, said second member being provided with an aperture, a latch slidably mounted in said casing, adapted when projected therefrom, to enter the aperture in said second member, a spring for projecting said latch, confined therebetween and the outer end wall of the casing and an actuating stem for the latch extending outwardly from the casing.

2. A dirigible headlight mechanism, comprising a steering arm, a rotatable lamp support, a hollow member secured to the lamp support provided with a laterally directed casing closed at its outer end and in direct communication with the bore of the hollow member, a second member extending from the steering arm and slidable in said hollow member said second member being provided with a narrow elongated slot adapted at times to be disposed opposite said casing, a latch movable in the casing having a shape complementary to said slot and normally adapted to enter the same when projecting from the casing, a spring for projecting the latch contained within the casing and an actuating stem carried by the latch mounted for sliding and rotatable movement, whereby the latch may be retracted from the slot and turned at right angles to its former position to prevent reengagement in the slot.

In witness whereof, we have hereunto set our hands.

ARTHUR N. GOODWIN.
WILLIAM SUTHERLAND.